United States Patent [19]

Wang et al.

[11] 4,147,644

[45] Apr. 3, 1979

[54] COLLECTOR COMBINATION FOR NON-SULFIDE ORES

[75] Inventors: Samuel S. Wang, Cheshire; Eugene L. Smith, Jr.; Ernie F. Huliganga, both of Milford, all of Conn.

[73] Assignee: American Cyanamid Company, Stamford, Conn.

[21] Appl. No.: 863,035

[22] Filed: Dec. 21, 1977

[51] Int. Cl.[2] .......................... B03D 1/02; C09K 3/00

[52] U.S. Cl. ...................................... 252/61; 209/166

[58] Field of Search ................ 209/166; 252/61; 75/2; 260/513 F

[56] References Cited

U.S. PATENT DOCUMENTS

| | | | |
|---|---|---|---|
| 2,120,217 | 6/1938 | Harris | 209/166 |
| 2,732,398 | 1/1956 | Brice et al. | 260/513 |
| 2,788,362 | 4/1957 | Barnhart et al. | 260/465.2 |
| 2,879,302 | 3/1959 | England et al. | 260/606.5 |
| 3,186,546 | 6/1965 | Keen | 209/166 |
| 3,402,197 | 9/1968 | Nychka | 260/513 F |
| 3,405,802 | 10/1968 | Preller et al. | 209/166 |
| 3,482,688 | 12/1968 | Bushell et al. | 209/166 |

FOREIGN PATENT DOCUMENTS

| | | | |
|---|---|---|---|
| 707350 | 4/1965 | Canada. | |
| 589800 | 7/1947 | United Kingdom | 109/166 |

OTHER PUBLICATIONS

Chemical Abstracts, vol. 80, 1974, p. 92 (49584j).

*Primary Examiner*—P. E. Willis, Jr.
*Attorney, Agent, or Firm*—William J. van Loo

[57] ABSTRACT

Combinations of fatty acids and anionic perfluoroalkyl compounds are superior collectors in the froth flotation of non-sulfide minerals.

10 Claims, No Drawings

COLLECTOR COMBINATION FOR NON-SULFIDE ORES

CROSS-REFERENCE TO RELATED APPLICATIONS

This application is related to application Ser. No. 863,034 filed on even date herewith. The present application relates to a collector combination and the related application relates to a process of use thereof.

This invention relates to a collector combination for the froth flotation of non-sulfide ores. More particularly, this invention relates to such a combination comprising a fatty acid and a perfluoroalkyl carboxylate or sulfonate.

Froth flotation is the principal means by which phosphate, barite, fluorite, hematite, taconite, magnetite and a host of other ores are concentrated. Its chief advantage lies in the fact that it is a relatively efficient process operating at substantially lower costs than many other processes.

Flotation is a process for separating finely ground valuable minerals from their associated gangue, or waste or for separating valuable components one from another. In froth flotation, frothing occurs by introducing air into a pulp of finely divided ore and water containing a frothing agent. Minerals that have a special affinity for air bubbles rise to the surface in the froth and are separated from those wetted by the water. The particles to be separated by froth flotation must be of a size that can be readily levitated by the air bubbles.

Agents called collectors are used in conjunction with flotation to promote recovery of the desired material. The agents chosen must be capable of selectively coating the desired material in spite of the presence of many other mineral species. Current theory states that the flotation depends upon the relative wettability of surfaces. Typically, the surface free energy is purportedly lowered by the adsorption of heteropolar surface active agents. The hydrophobic coating thus provided acts in this explanation as a bridge so that the particle may be attached to an air bubble. It is to be understood, however, that the practice of this invention is not limited by this or other theories.

Phosphate rock is a typical example of a non-sulfide mineral. Typically, phosphate ore containing about 15–35% BPL[bone phosphate of lime, $Ca_3(PO_4)_2$] is concentrated in very large tonnages from the Florida pebble phosphate deposits. The ore slurry from strip mining is sized at about 1 millimeter and the coarser fraction, after scrubbing to break up mud balls, is a finished product. The minus 1 mm fraction is further sized at 35 and 200 mesh. The minus 200 mesh slime is discarded. From the sizing operation, the +35 mesh fraction in thick slurry is treated with fatty acid, fuel oil, and caustic, ammonia, or other alkaline material and the resulting agglomerates are separated on shaking tables, spirals or spray belts. The 35×200 mesh fraction is conditioned with the same type of reagents and floated by conventional froth flotation routes. Not all the silica gangue is rejected by the fatty acid flotation, so the concentrate is blunged with acid to remove collector coatings, deslimed, washed free of reagents and subjected to an amine flotation with fuel oil at pH 7–8. This latter flotation, sometimes called "cleaning", removes additional silica and raises the final concentrate grade to 75–80% BPL.

Although the procedure described above is effective in the recovery of mineral values of non-sulfide ores, there, nevertheless, exists the need for more effective collectors which provide increased recovery of non-sulfide minerals while still providing high grade. It is particularly desirable to reduce the requirements for fatty acids which are constantly being diverted to nutritional and other uses. In view of the high quantities of non-sulfide minerals processed by froth flotation, such a development can result in a substantial increase in the total amount of mineral values recovered and provide substantial economic advantages even when a modest increase in recovery is provided. It is also highly desirable to have an efficient collector system for use at reduced dosage levels without sacrificing the mineral recovery performance. The decreases in reagent consumption are significant in view of the increasing diversion of fatty acids to nutritional and other uses. Accordingly, the provision for an improved collector combination for froth flotation of non-sulfide minerals would fulfill a long-felt need and constitute a notable advance in the art.

In accordance with the present invention, there is provided a collector combination for non-sulfide ores comprising from about 60.0 to about 99.9 weight percent of a fatty acid derived from a vegetable or animal oil and, correspondingly, from about 40.0 to about 0.1 weight percent of an anionic perfluoroalkyl compound of the general formula $$CF_3(CF_2)_m(CH_2)_n Y—X$$

wherein Y is $—COO^-$ or $—SO_3^-$, X is hydrogen, alkali metal or ammonium ion, m is an integer of about 4 to 8 and n is 0 or 1.

The collector combination of the present invention provides higher recovery than can be obtained with either ingredient alone, the perfluoroalkyl compound being inactive alone. The effective combination reduces requirements for fatty acid and provides greater recovery of non-sulfide mineral values. It is unexpected that the perfluoroalkyl compounds which are completely ineffective when used alone should provide a boostering action when employed in combination with a fatty acid in the froth flotation of a non-sulfide ore.

The first essential ingredient comprising the collector combination of the present invention is a fatty acid derived from a vegetable or animal oil. Illustrative vegetable oils include babassu, castor, Chinese tallow, coconut, corn, cottonseed, grapeseed, hempseed, kapok, linseed, wild mustard, oiticica, olive, ouri-ouri, palm, palm kernel, peanut, perilla, poppyseed, Argentine rapeseed, rubberseed, safflower, sesame, soybean, sugarcane, sunflower, tall, teaseed, tung and ucuhuba oils. Animal oils include fish and livestock oils. These oils contain acids ranging from six to twenty-eight carbon atoms or more which may be saturated or unsaturated, hydroxylated or not, linear or cyclic and the like.

The second essential ingredient comprising the collector combination of the present invention is an anionic perfluoroalkyl compound of the general formula $$CF_3(CF_2)_m(CH_2)_n Y—X$$

wherein Y is $—COO^-$ or $—SO_3^-$, X is hydrogen, alkali metal, or ammonium ion, m is an integer of about 4 to 8, and n is 0 or 1. Specific illustrative compounds of this formula include $CF_3\text{-}(CF_2)_6COONH_4$ $CF_3\text{-}(CF_2)_6SO_3K$ as well as the corresponding free acids and sodium salts.

In combining these two ingredients to provide the collector combination, the fatty acid must comprise from about 60.0 to about 99.9 weight percent and, correspondingly, the perfluoroalkyl compound must comprise from about 40.0 to about 0.1 weight percent of the two ingredients. A preferred collector combination is one containing from about 90 to about 99.9 weight percent of fatty acid and, correspondingly, from about 10 to about 0.1 weight percent of perfluoroalkyl compound.

In carrying out froth flotation of a non-sulfide mineral using the collector combination of the present invention, a non-sulfide mineral capable of froth flotation using a fatty acid is selected. Suitable non-sulfide minerals include, for example, phosphate, hematite, barite, fluorite, calcite, magnesite, sheelite and the like. The selected mineral is screened to provide particles of flotation size in accordance with conventional procedures. Generally, the flotation size will encompass from about 35 to 200 mesh size particles. After the selected mineral has been sized as indicated, it is slurried in aqueous medium and conditioned with an effective amount of the collector combination. Generally, an effective amount will be in the range of about 0.1 to 2.0 pounds per ton of ore but variations outside this range may occur depending upon such variables as the specific non-sulfide ore processed, the nature and amount of gangue material present, the particular collector combination employed, the actual values of recovery and grade desired and the like.

In addition to the collector combination, conditioning may also include other reagents as are conventionally employed. Non-sulfide ores are generally processed at a pH value in the range of about 6.0 to 12.0, preferably about 8.0 to 10.0. Accordingly, pH regulators may be used as well as frothers, fuel oil and the like.

After the slurry is conditioned, it is subjected to froth flotation following conventional procedures. The desired mineral values are recovered with the froth and the gangue remains behind.

The invention is more fully illustrated in the examples which follow wherein all parts and percentages are by weight unless otherwise specified. The following general procedure is employed in the froth flotation examples given.

GENERAL PROCEDURE

Rougher Float

Step 1:

Secure washed and sized feed, e.g., 35×150 mesh screen fractions. Typical feed is usually a mixture of 23% coarse with 77% fine flotation particles.

Step 2:

Sufficient wet sample, usually 640 grams, to give a dry weight equivalent of 500 grams. The sample is washed once with about an equal amount of tap water. The water is carefully decanted to avoid loss of solids.

Step 3:

The moist sample is conditioned for one minute with approximately 100 cc of water, sufficient caustic as 5–10% aqueous solution to obtain the pH desired (pH 9.5–9.6) a mixture of 50% acid and fuel oil and additional fuel oil as necessary. Additional water may be necessary to give the mixture the consistency of "oatmeal" (about 69% solids). The amount of caustic will vary from 4 to about 20 drops. This is adjusted with a pH meter for the correct endpoint. At the end of the conditioning, additional caustic may be added to adjust the endpoint. However, an additional 15 seconds of conditioning is required if additional caustic is added to adjust the pH. Five to about 200 drops of acid-oil mixture and one-half this amount of additional oil is used, depending on the treatment level desired.

Step 4:

Conditioned pulp is placed in an 800-gram bowl of a flotation machine and approximately 2.6 liters of water are added (enough water to bring the pulp level to lip of the container). The percent solids in the cell is then about 14%. The pulp is floated for 2 minutes with air introduced after 10 seconds of mixing. The excess water is carefully decanted from the rougher products. The tails are set aside for drying and analysis.

Step 5:

The products are oven dried, weighed and analyzed for weight percent $P_2O_5$ or BPL. Recovery of mineral values is calculated using the formula:

$$\frac{(w_c)\,(P_c)}{(W_c)\,(P_c) + (W_t)\,(P_t)} \times 100$$

wherein $W_c$ and $W_t$ are the dry weights of the concentrate and tailings, respectively, and $P_c$ and $P_t$ are the weight percent $P_2O_5$ or BPL of the concentrate or tails, respectively.

EXAMPLE 1

Following the general procedure, a series of collector combinations were employed in the froth flotation of Florida pebble phosphate. In separate runs, a fatty acid derived from tall oil was employed alone and in combination with each of two perfluoroalkyl compounds. In each instance, the total dosage of collector was 0.5 lbs. per ton and an equal dosage of No. 5 fuel oil was employed. The slurry was adjusted to pH 9.0 with caustic. The compounds employed and the results obtained are given in Table I which follows.

TABLE I

Froth Flotation of Florida Phosphate

| Run | Booster | Ratio Fatty Acid/Booster | Recovery Weight(%) | BPL (%) Feed | Tail | Conc | BPL Recovery (%) |
|---|---|---|---|---|---|---|---|
| 1 | None | — | 17.01 | 17.56 | 6.92 | 69.49 | 67.30 |
| 2 | $CF_3\text{-}(CF_2)_6COONH_4$ | 99.5/0.5 | 21.17 | 18.06 | 4.87 | 67.19 | 78.75 |
| 3 | $CF_3\text{-}(CF_2)_6SO_3K$ | 99.5/0.5 | 19.25 | 18.63 | 6.49 | 69.55 | 71.87 |

EXAMPLE 2

Again, following the general procedure, a series of runs were made using a fatty acid derived from tall oil and the perfluoroalkyl compound $CF_3\text{-}(CF_2)_6$ $COONH_4$ in various weight percent combinations as well as in separate uses. The compositions employed and the results obtained are given in Table II. To obtain the expected value for recovery listed in Table II, a plot of the results using fatty acid alone and perfluoroalkyl compound alone was made. A straight line connecting these two points was then constructed. The expected value for recovery is that value read from the plot which corresponds to the composition of the collector combination.

TABLE II

Collector Combinations for Florida Phosphate

| Run | Collector Composition F.A.% | PFA% | Recovery Weight% | BPL(%) Feed | Tail | Conc | BPL(%) Recovery | Expected Recovery(%) |
|---|---|---|---|---|---|---|---|---|
| 1 | 100 | 0 | 17.01 | 17.56 | 6.92 | 69.49 | 67.30 | 67.30 |
| 2 | 95 | 5 | 20.49 | 18.57 | 5.52 | 68.90 | 76.28 | 64.00 |
| 3 | 90 | 10 | 21.10 | 18.47 | 4.81 | 69.55 | 79.45 | 60.50 |
| 4 | 80 | 20 | 18.27 | 18.61 | 6.98 | 70.67 | 69.36 | 59.00 |
| 5 | 70 | 30 | 16.87 | 15.94 | 5.43 | 67.71 | 71.68 | 47.00 |
| 6 | 60 | 40 | 5.79 | 16.90 | 13.98 | 64.55 | 22.10 | 40.00 |
| 7 | 50 | 50 | 4.82 | 16.98 | 14.41 | 67.67 | 19.21 | 33.50 |
| 8 | 40 | 60 | 0.52 | 18.26 | 18.22 | 26.70 | 0.76 | 27.00 |
| 9 | 0 | 100 | 0.16 | Insufficient to Assay | | | | 0 |

Notes:
FA = Fatty acid derived from tall oil
PFA = $CF_3\!-\!(CF_2)_6COONH_4$

The results show that collector combinations comprising at least 60 weight percent of fatty acid provide booster action over the use of fatty acid alone. Surprisingly, combinations containing more than about 40 weight percent of perfluoroalkyl compound depress action compared to fatty acid alone.

We claim:

1. A collector combination for non-sulfide ores comprising from about 70.0 to about 99.9 weight percent of a fatty acid derived from a vegetable or animal oil and, correspondingly from about 30.0 to about 0.1 weight percent of an anionic perfluoroalkyl compound of the general formula $$CF_3-(CF_2)_m-(CH_2)_n-Y-X$$

wherein Y is $-COO^-$ or $-SO_3^-$, X is a hydrogen, alkali metal, or ammonium ion, m is an integer of about 4 to 8, and n is 0 or 1.

2. The collector combination of claim 1 wherein said perfluoroalkyl compound has the formula $CF_3-(CF_2)_mCOOX$.

3. The collector combination of claim 1 wherein said perfluoroalkyl compound has the formula $CF_3-(CF_2)_mSO_3X$.

4. The collector combination of claim 2 wherein m has a value of 6.

5. The collector combination of claim 3 wherein m has a value of 6.

6. The collector combination of claim 4 wherein X is an ammonium ion.

7. The collector combination of claim 5 wherein X is a potassium ion.

8. The collector combination of claim 1 comprising from about 90 to about 99.9 weight percent of said fatty acid and, correspondingly, from about 10 to about 0.1 weight percent of said perfluoroalkyl compound.

9. The collector composition of claim 8 wherein said perfluoroalkyl compound has the formula $CF_3-(CF_2)_6COONH_4$.

10. The collector composition of claim 8 wherein said perfluoroalkyl compound has the formula $CF_3-(CF_2)_6SO_3K$.

* * * * *